(12) United States Patent
Moran et al.

(10) Patent No.: US 9,438,525 B2
(45) Date of Patent: Sep. 6, 2016

(54) SCHEDULING MODULE AND METHOD THEREOF

(75) Inventors: Robert Moran, Largs (GB); Rao Karthik C Ganesh, Noida (IN); Robin Paling, Bathgate (GB)

(73) Assignee: FREESCALE SEMICONDUCTOR, INC., Austin, TX (US)

( * ) Notice: Subject to any disclaimer, the term of this patent is extended or adjusted under 35 U.S.C. 154(b) by 99 days.

(21) Appl. No.: 14/402,935

(22) PCT Filed: Jun. 1, 2012

(86) PCT No.: PCT/IB2012/052779
§ 371 (c)(1),
(2), (4) Date: Nov. 21, 2014

(87) PCT Pub. No.: WO2013/179099
PCT Pub. Date: Dec. 5, 2013

(65) Prior Publication Data
US 2015/0156128 A1    Jun. 4, 2015

(51) Int. Cl.
*H04L 12/863* (2013.01)
*H04L 29/02* (2006.01)
*G06F 13/38* (2006.01)

(52) U.S. Cl.
CPC ............. *H04L 47/50* (2013.01); *G06F 13/382* (2013.01)

(58) Field of Classification Search
CPC ....... H04L 47/50; G06F 13/14; G06F 13/38; G06F 13/382; G06F 11/3051; G06F 2212/621; G06F 2213/2416
See application file for complete search history.

(56) References Cited

U.S. PATENT DOCUMENTS

| | | | |
|---|---|---|---|
| 5,805,922 A | 9/1998 | Sim et al. | |
| 5,933,611 A | 8/1999 | Shakkarwar | |
| 7,724,598 B1 * | 5/2010 | Chan | G06F 12/0292 326/38 |
| 7,764,614 B2 | 7/2010 | Wang | |
| 7,991,296 B1 | 8/2011 | Johnston et al. | |
| 8,139,589 B2 * | 3/2012 | Choi | H04W 84/18 370/401 |
| 2004/0039866 A1 | 2/2004 | Cheung | |
| 2004/0049623 A1 | 3/2004 | Barnett | |
| 2007/0283067 A1 * | 12/2007 | Patella | G06F 13/24 710/260 |
| 2008/0091848 A1 * | 4/2008 | Kuo | G06F 13/385 710/6 |
| 2009/0113118 A1 * | 4/2009 | Lee | G06F 12/0246 711/103 |
| 2010/0146157 A1 | 6/2010 | Choi et al. | |

OTHER PUBLICATIONS

International Search Report and Written Opinion correlating to PCT/IB2012/052779 dated Dec. 26, 2012.

* cited by examiner

*Primary Examiner* — Ahmed Elallam

(57) ABSTRACT

A scheduling module arranged to schedule the transmission of data from a plurality of data sources over a serial communication interface. The scheduling module comprises a register array and is arranged to selectively couple one of the data sources to the serial communication interface based at least partly on a source identifier value stored within a currently selected register within the register array. The scheduling module is further arranged to select a next sequential register within the register array upon receipt of a trigger signal.

18 Claims, 4 Drawing Sheets

SCHEDULING MODULE AND METHOD THEREOF

FIELD OF THE INVENTION

The field of this invention relates to a scheduling module and method therefor. In particular, the invention relates to a scheduling module arranged to schedule the transmission of data from a plurality of data sources over a serial communication interface.

BACKGROUND OF THE INVENTION

In the field of integrated circuit devices, for many modern embedded applications there is a need for serialisation of timer channels etc. in order to reduce the number of pins required implement such timer channels between, say, a microcontroller unit (MCU) of the embedded application and external devices operably coupled thereto. For clarity, such a timer channel may comprise, by way of example, a timing control signal to an external hardware component that generates input/output required to, say, switch at times dependent on user configurations or the like. For example, such a timer channel may comprise a single timing control signal to an external hardware component arranged to generate a pulse-width modulated (PWM) output. Accordingly, the scheduling of such timer channels is of importance in order to ensure correct operation of the components reliant thereon.

Serial peripheral interface (SPI) frames are often used to send control data to the same external devices for which the timer channels are required. As such, it is conventional for SPI frames and timer channels to be transmitted over the same communications channel, whereby SPI frames are interleaved with the serialised timer channels.

A challenge faced by manufacturers of embedded semiconductor devices for use within such systems is that different applications require unique rules for determining when SPI frames may be interleaved within the serialised timer channels, for example in order to avoid jitter of the serialised timer channels. There is currently no common standard approach to determining how such interleaving of SPI frames within timer channels should be implemented. As such, manufacturers of embedded semiconductor devices for use within such systems are faced with different requirements from different customers in terms of controlling the interleaving of SPI frames within the timer channels. It is desirable, from a manufacturer's point of view, to be able to develop and manufacture a single integrated circuit (IC) device that is capable of supporting the interleaving requirements of multiple customers for different applications.

For applications such as automotive applications, in which high speed scheduling of the SPI frames and timer channels being transmitted over a shared communications channel is required, it is known to use hard state machines to perform the required (high speed) scheduling and interleaving. However, a problem with using hard state machines in this manner is that they are typically limited to implementing a particular interleaving rule set. Accordingly, in order to enable support within a single IC device using such hard state machines, it is necessary to provide multiple hard state machines within the IC device. The inclusion of multiple hard state machines undesirable increases the die size of the IC device, and increases development time due to the need for designing, testing and validating the multiple hard state machines.

A software based implementation in which the scheduling of the SPI frames and timer channel is performed by software would enable a flexible implementation to be provided. However, such an implementation would have a significant impact on the processing performance of the MCU, for example requiring up to 50% of the processing capabilities of a 200 MHz processor to achieve a 1 µs transmit period.

SUMMARY OF THE INVENTION

The present invention provides a scheduling module arranged to schedule the transmission of data from a plurality of data sources over a serial communication interface and a method of scheduling the transmission of data from a plurality of data sources over a serial communication interface as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION

Example embodiments of the present invention will now be described with reference to the accompanying drawings, and in particular with reference to a scheduling module forming part of a master device within the serial communication system. However, it will be appreciated that the present invention is not limited to the specific illustrated embodiments described herein, and may equally be applied within any alternative serial communication system in which data from multiple sources is required to be transmitted over a serial communication interface. Furthermore, because the illustrated embodiments of the present invention may for the most part, be implemented using electronic components and circuits known to those skilled in the art, details will not be explained in any greater extent than that considered necessary as illustrated below, for the understanding and appreciation of the underlying concepts of the present invention and in order not to obfuscate or distract from the teachings of the present invention.

Figure 1:
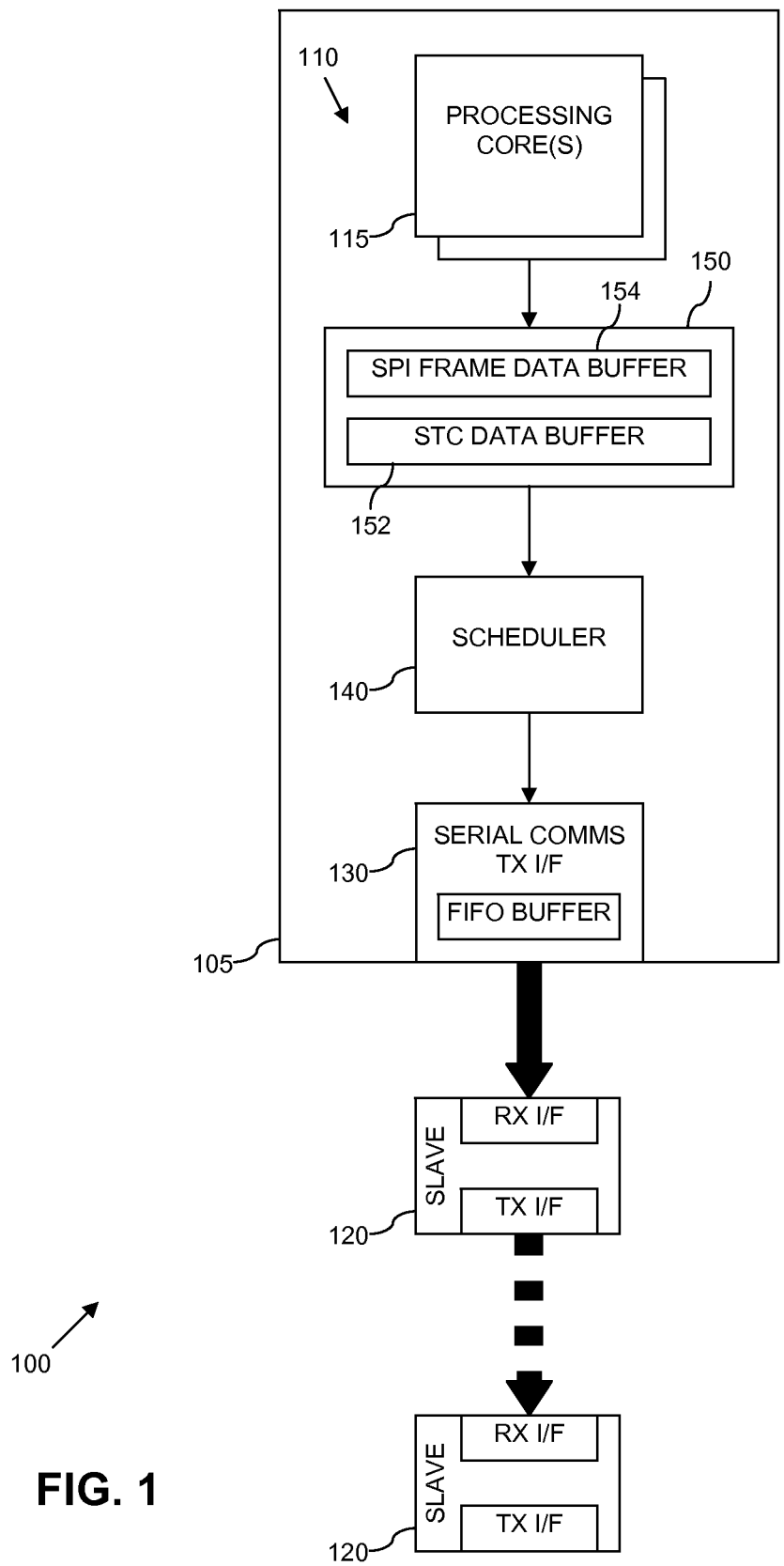
FIG. 1 illustrates a simplified block diagram of an example of a part of a serial communication system.

Referring first to FIG. 1, there is illustrated a simplified block diagram of an example of a part of a serial communication system 100, such as may be implemented within, say, an embedded digital application. In the illustrated example, the serial communication system 100 comprises a master device 110, for example comprising one or more processing cores 115 implemented within an integrated circuit device 105, for example comprising at least one die within in a single integrated circuit package. The serial communication system 100 further comprises one or more slave devices 120 located external to the master device 110, and operably coupled thereto by way of a serial communication interface, a transmit component thereof within the master device 110 being illustrated at 130.

The serial communication system 100 further comprises a scheduling module 140 operably coupled to the transmit component 130 of the serial communication interface, and arranged to schedule the transmission of data there across. In particular, the scheduling module 140 is arranged to schedule the transmission of data from a plurality of data sources 150 within the master device 110 over the serial communication interface 130. For example, the scheduling module 140 may be arranged to schedule the transmission of timing data from at least a first data source, such as serialised timer channel (STC) data from an STC data buffer 152, and command data from at least one further data source, such as serial peripheral interface (SPI) data from an SPI frame data buffer 154, over the serial communication interface 130.

In the illustrated example, the processing core(s) 115 is/are illustrated as being operably coupled to, and thus capable of providing the data for, the data sources 150. It will be appreciated that the data sources 150 are not limited receiving data from such processing core(s) 115, and may additionally/alternatively receive data provided by other components. For example, data within the data sources 150 may be provided by other logic circuits within the master device 110 (not shown), such as a DMA (direct memory access) controller or the like, and/or by peripheral modules (not shown) of the master device 110.

Figure 2:
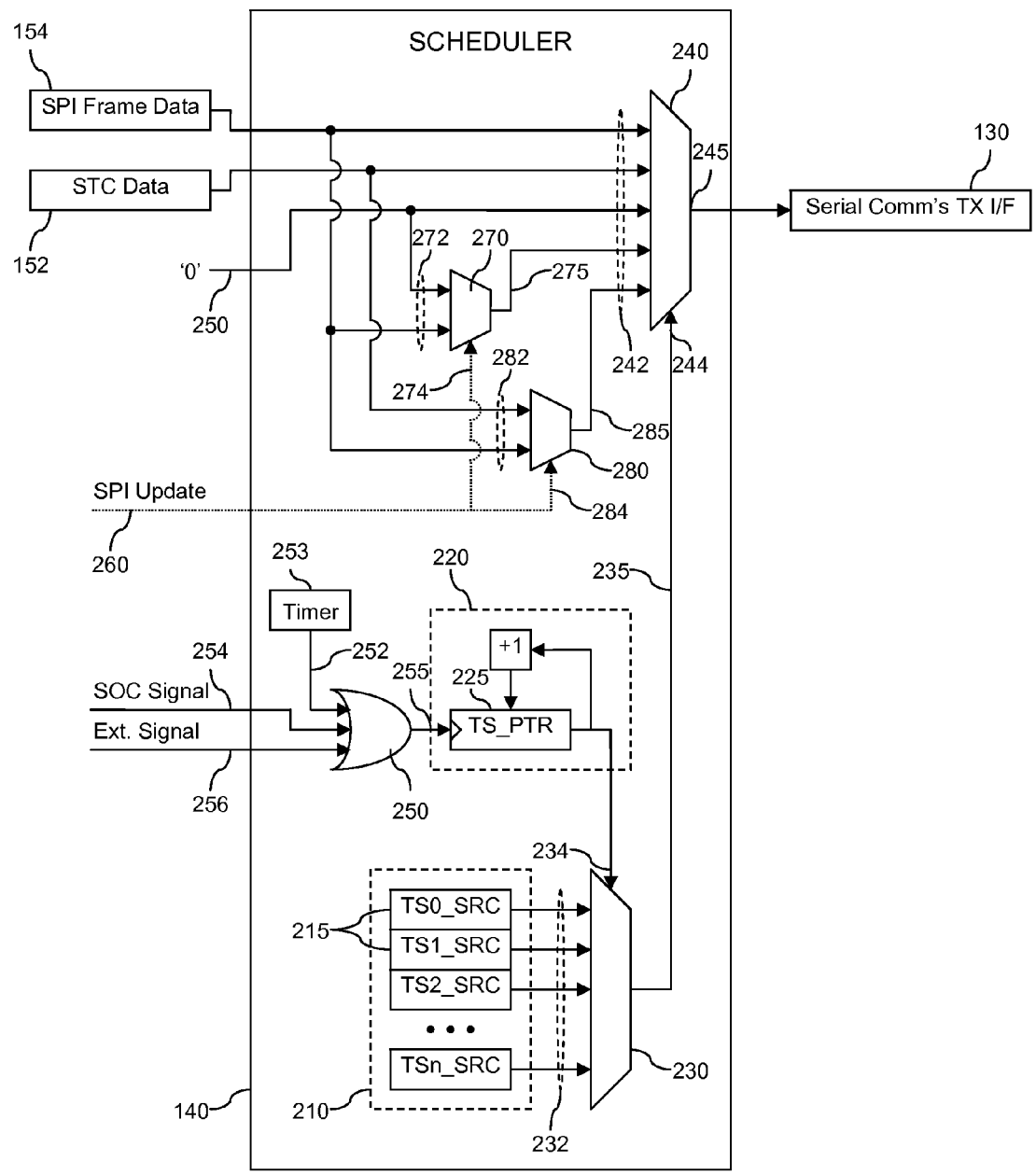
FIG. 2 illustrates a simplified block diagram of an example of a scheduling module.

Referring now to FIG. 2, there is illustrated a simplified block diagram of an example of the scheduling module 140. The scheduling module 140 comprises a register array 210, the register array comprising a plurality of programmable registers 215; each register 215 being arranged to store therein a source identifier value. In some examples, the registers 215 may programmable by one or more of the processing cores 115 illustrated in FIG. 1. The scheduling module 140 is arranged to selectively couple one of a plurality of data sources to the serial communication interface 130 based at least partly on a source identifier value stored within a currently selected register 215 within the register array 210.

For example, in FIG. 2 the scheduling module 140 comprises a register pointer component 220 arranged to store and output a register pointer value 225 corresponding to a register 215 within the register array 210, and the scheduling module 140 is arranged to selectively couple one of a plurality of data sources to the serial communication interface 130 based at least partly on a source identifier value stored within a register 215 within the register array 210 to which the register pointer value 225 corresponds. The scheduling module 140 in the example illustrated in FIG. 2 further comprises a first multiplexer component 230 operably coupled to the registers 215 within the register array 210 and arranged to receive at inputs 232 thereof the source identifier values stored within said registers 215. The first multiplexer component 230 is further arranged to receive, at a control input 234 thereof, the register pointer value 225 stored within the register pointer component 220, and is arranged to selectively output 235 one of the source identifier values received thereby from the registers 215 in accordance with the received register pointer value 225. In particular, the first multiplexer component 230 is arranged to output 235 a source identifier value stored within a register 215 corresponding to the register pointer value 225 received thereby.

The scheduling module 140 in the example illustrated in FIG. 2 further comprises a second multiplexer component 240 operably coupled to the plurality of data sources. In the illustrated example, the plurality of data sources comprise the STC data buffer 152 and the SPI frame data buffer 154 illustrated in FIG. 1, which are arranged to store therein STC data and SPI frame data respectively for transmission over the serial communication interface 130. In addition, the plurality of data sources further comprises, in the illustrated example, a 'delay' or 'passive' data source 250, illustrated in FIG. 2 by way of a '0' value. The delay/passive data source 250 provides null data to be transmitted when no STC data or SPI frame data is required and/or desired to be transmitted over the serial communication interface 130. Accordingly, the second multiplexer component 240 is arranged to receive at inputs 242 thereof data stored within the SPI frame data buffer 154, data stored within the STC data buffer 152 and the delay/passive data 250. The second multiplexer component 230 is further arranged to receive, at a control input 244 thereof, the source identifier value 235 stored within the 'currently selected' register 215 of the register array 210 (e.g. the register 215 to which the register pointer value 225 corresponds), and output by the first multiplexer component 230. An output 245 of the second multiplexer component 240 is operably coupled to the serial communication interface component 130. The second multiplexer component 240 is thus arranged to selectively output to the serial communication interface component 130 data received from one of the plurality of data sources 152, 154, 250 in accordance with the source identifier value 235 stored within the 'currently selected' register 215 and output by the first multiplexer component 230.

In this manner, the scheduling module 140 is arranged to selectively couple one of the data sources 152, 154, 250 to the serial communication interface 130 based (at least partly) on the source identifier value 235 stored within the currently selected register 215 within the register array 210 (i.e. the register 215 corresponding to the register pointer value 225). Thus, the scheduling of data from the plurality of data sources 152, 154 to be transmitted over the serial communication interface 130 is implemented through hardware components, enabling high speed scheduling required for application such as automotive applications, whilst also enabling flexible configuration of the scheduling rules via the use of the programmable registers 215 within the register array 210, as described in greater detail below.

The scheduling module 140 is further arranged to select a next sequential register 215 within the register array 210 upon receipt of a trigger signal. It will be appreciated that the registers 215 may be selected in any suitable sequence. However, for simplicity, the registers 215 within the register array 210 in the illustrated example are selected in a linear, cyclic sequence, as described in greater detail below. The trigger signal may comprise any appropriate trigger signal. For example, and as illustrated in FIG. 2, the trigger signal may be implemented by way of a signal, such as the timer signal 252. In this manner, a substantially periodic trigger signal may be provided to the scheduling module 140, thereby providing substantially consistent trigger intervals between selecting next sequential registers 215. Such a timing signal 252 may be generated by a timing circuit 253 provided within the scheduling module 140 (as illustrated in FIG. 2), or alternatively may be generated by a timing circuit located externally to the scheduling module 140. In other examples, other forms of trigger signal may additionally and/or alternatively be implemented. For example, a trigger signal 254 may be generated within a system-on-chip of which the scheduling module 140 forms an integral part, for example generated by one or more of the processing cores 115 illustrated in FIG. 1. Additionally and/or alternatively, a trigger signal may comprise an external event trigger signal 256, for example generated external to the system-on-chip of which the scheduling module 140 forms an integral part, for example generated external to the master device 110 illustrated in FIG. 1.

In the example illustrated in FIG. 2, the scheduling module 140 comprises an OR gate 250 arranged to receive at inputs thereof each of the trigger signals 252, 254, 256. An output 255 of the OR gate 250 is provided to the register pointer component 210, which is arranged to increment the register pointer value 225 stored therein upon receipt of a trigger signal 255 output by the OR gate 250. In this manner, the register pointer component 210 in the example illustrated in FIG. 2 is arranged to increment the register pointer value 225 upon receipt of a trigger signal from any one of the signals 252, 254, 256. Upon incrementing the register pointer value 225 in this manner, the first multiplexer component 230 will subsequently output the source identifier value stored within the next register 215, in accordance with the incremented register pointer value 225; this next register thereby becoming the new 'currently selected' register 215. Upon a change in the source identifier value output by the first multiplexer component 230 following receipt of a trigger signal in this manner, the second multiplexer component 240 will be caused to selectively output to the serial communication interface component 130 data received from one of the plurality of data sources 152, 154, 250 in accordance with the new source identifier value 235 stored within the new 'currently selected' register 215.

Thus, in this manner, by incrementing the register pointer value 225 upon receipt of a trigger signal, each register 215 within the register array 210 may be sequentially selected in a linear manner. The register pointer component 220 may be arranged to restrict the register pointer value 225 to, say, a range of 0 to N−1, where N is the number of registers 215 within the register array 210, and to cause the register pointer value 225 to wrap around back to 0 after reaching N−1. In this manner, the continued incrementing of the register pointer value 225 upon receipt of trigger signals will cause the cyclic sequential selection of the registers 125.

Each register 215 may be considered as representing a timeslot for the scheduling of data to be transmitted over the serial communication interface component 130. As such, the data source from which data is to be transmitted within each timeslot may be configurably (and flexibly) defined by way of the source identifier value stored within the respective register 215. In some examples, it is contemplated that the register pointer component 220 may be configurable to restrict the register pointer value 225 to a range smaller than that of 0 to N−1. In this manner, a cycle of less than N timeslots may be configurable, for example M timeslots, whereby only a subset of the registers 215 (i.e. the first M registers 215 in the array 210) are cyclically sequentially selected, and from which source identifier values are output to the second multiplexer component 240.

In some examples, the registers 215 may be arranged to comprise one or more source identifier values that directly identify a particular data source, herein after referred to as a static source identifier value. For example, such a static source identifier value may directly identify one of the STC data buffer 152, the SPI frame data buffer 154 or the delay/passive data 250. Accordingly, upon receipt of such a static source identifier value at its control input 244, the second multiplexer component 240 is arranged to selectively couple the corresponding data source to the serial communication interface component 130.

In some examples, the registers 215 may additionally/alternatively be arranged to comprise one or more dynamic source identifier values, wherein the selection of a data source to be coupled to the serial communication interface component 130 is further dependent on one or more conditional signals. In this manner, the scheduling module 140 may be further arranged to selectively couple one of the data sources to the serial communication interface further based on at least one conditional signal, upon the source identifier value stored within the currently selected register comprising such a dynamic source identifier value. For example, and as illustrated in FIG. 2, such a conditional signal may comprise a command data update signal, such as the SPI update signal illustrated at 260, which is arranged to indicate when new/updated SPI data is available within the SPI frame data buffer to be transmitted.

In the example illustrated in FIG. 2, the scheduling module 140 comprises a third multiplexing component 270 comprising a data inputs 272 operably coupled to the SPI frame data buffer 154 and the delay/passive data 250 respectively, and a control input 274 operably coupled to the SPI update signal 260. An output 275 of the third multiplexing component 270 is operably coupled to an input 242 of the second multiplexing component 240. In this manner, the third multiplexing component 270 is arranged to output either data stored within the SPI frame data buffer 154 or the delay/passive data 250, depending on the value of the SPI update signal 260, and to provide the respective data to the second multiplexing component 240 as a dynamic data source.

The scheduling module 140 in FIG. 2 further comprises a fourth multiplexing component 280 comprising a data inputs 282 operably coupled to the STC data buffer 152 and the SPI frame data buffer 154 respectively, and a control input 284 operably coupled to the SPI update signal 260. An output 285 of the fourth multiplexing component 280 is operably coupled to an input 242 of the second multiplexing component 240. In this manner, the fourth multiplexing component 280 is arranged to output either data stored within the STC data buffer 152 or data stored within the SPI frame data buffer 154, depending on the value of the SPI update signal 260, and to provide the respective data to the second multiplexing component 240 as a further dynamic data source.

In this manner, the scheduling module 140 in the illustrated example is arranged to selectively couple the SPI frame data buffer 154 to the serial communication interface component 130 upon the source identifier value within the currently selected register 210 comprising the respective dynamic source identifier value, and upon the command data update signal indicating the availability of updated command data. Conversely, the scheduling module 140 illustrated in FIG. 2 is arranged to selectively couple the STC data buffer 152 or the delay/passive data 250 to the serial communication interface component 130 upon the source identifier value within the currently selected register 210 comprising the respective dynamic source identifier value, and upon the command data update signal indicating no updated command data available.

Thus, the second multiplexer component 240 illustrated in FIG. 2 is arranged to selectively output to the serial communication interface component 130 data received from one of the 'static' data sources comprising:
- the STC data buffer 152;
- the SPI frame data buffer 154; and
- the delay/passive data source 250, or one of the 'dynamic' data sources comprising:
- source=SPI frame data buffer 154 if SPI updated/new available, else source=delay/passive data source 250 (as provided by the third multiplexing component 270); and
- source=SPI frame data buffer 154 if SPI updated/new available, else source=STC data buffer 152 (as provided by the fourth multiplexing component 280).

Thus, in the illustrated example the registers 215 may comprise source identifier values relating to these five data source options. Accordingly, each source identifier value comprise a three bit binary value.

Advantageously, the scheduling module 140 in the illustrated example enables up to N timeslots to be defined (N being the number of registers 215 available within the register array 210). Furthermore the scheduling module 140 enables a data source (either static or dynamic) to be configurably defined for each timeslot by way of loading a corresponding source identifier value into the respective register 215.

Figure 3:
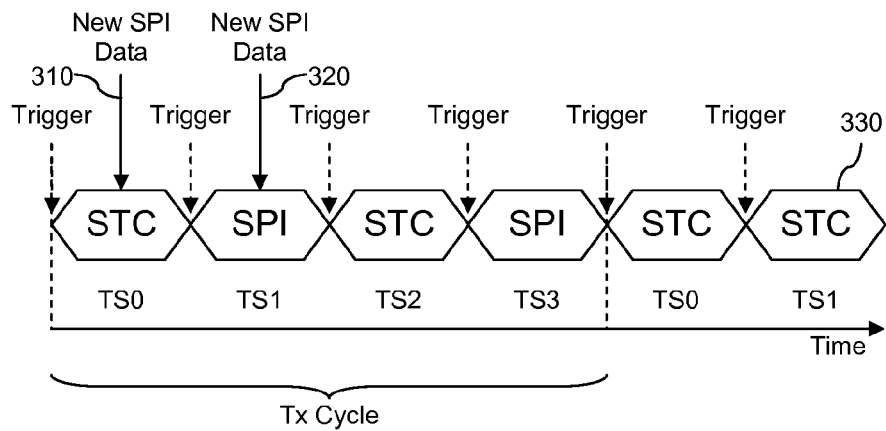
FIGS. 3 and 4 illustrate simplified diagrams of examples of scheduling of data from a plurality of data sources.

FIG. 3 illustrates a simplified diagram of an example of a transmission cycle in which the scheduling module 140 has been configured to schedule the transmission of data according to a first set of rules. In the example illustrated in FIG. 3, the scheduling module 140 has been configured to schedule the transmission of data by way of transmission cycles comprising four timeslots, TS0 to TS3. As described above, the scheduling module 140 may be configured to implement four timeslots by way of the register pointer component 220 being configured to restrict the register pointer value 225 to a range of, say, 0 to 3.

The scheduling module 140 has further been configured to transmit data according to the following set of rules:
- In TS0—data from STC data buffer 152 to be transmitted;
- In TS1—data from SPI frame data buffer 154 to be transmitted if available (i.e. dependent on SPI Update signal 260; else data from STC data buffer 152 to be transmitted;
- In TS2—data from STC data buffer 152 to be transmitted
- In TS3—data from SPI frame data buffer 154 to be transmitted if available (i.e. dependent on SPI Update signal 260; else data from STC data buffer 152 to be transmitted.

As described above, such rules may be implemented by way of the appropriate static/dynamic source identifier values being loaded into the corresponding registers 215.

In this manner, and as illustrated in FIG. 3, in each of timeslots TS0 and TS2 data from the STC data buffer 152 is scheduled for transmission over the serial communication interface 130. Conversely, in timeslots TS1 and TS3, when the SPI Update signal 260 indicates that new SPI data is available, such as illustrated at 310 and 320, data from the SPI frame data buffer 154 is scheduled for transmission over the serial communication interface 130. However, when no new SPI data is available, data from the STC data buffer 152 is scheduled for transmission over the serial communication interface 130 in timeslots TS1 and TS3, as illustrated at 330.

Figure 4:
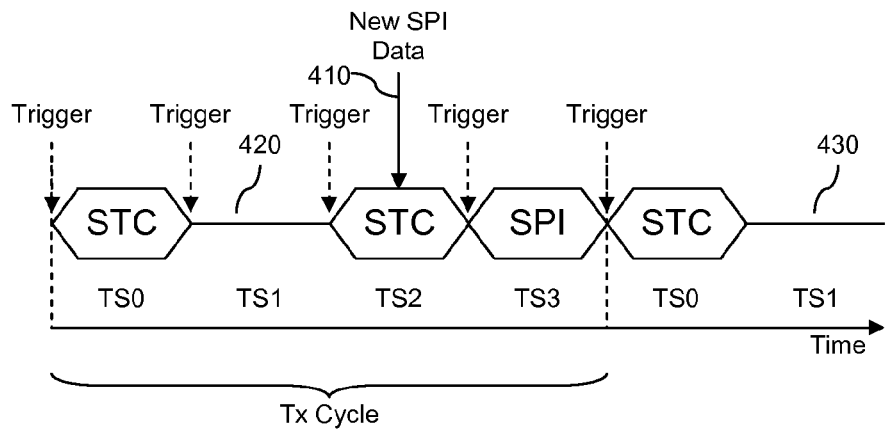

FIG. 4 illustrates a simplified diagram of an alternative example of a transmission cycle in which the scheduling module 140 has been configured to schedule the transmission of data according to a second set of rules. In the example illustrated in FIG. 4, the scheduling module 140 has again been configured to schedule the transmission of data by way of transmission cycles comprising four timeslots, TS0 to TS3, for example by way of the register pointer component 220 being configured to restrict the register pointer value 225 to a range of, say, 0 to 3.

In the example illustrated in FIG. 4, the scheduling module 140 has further been configured to transmit data according to the following set of rules:
- In TS0—data from STC data buffer 152 to be transmitted;
- In TS1—data from SPI frame data buffer 154 to be transmitted if available (i.e. dependent on SPI Update signal 260; else no data is to be transmitted;
- In TS2—data from STC data buffer 152 to be transmitted;
- In TS3—data from SPI frame data buffer 154 to be transmitted if available (i.e. dependent on SPI Update signal 260; else no data is to be transmitted.

As described above, such rules may be implemented by way of the appropriate static/dynamic source identifier values being loaded into the corresponding registers 215.

In this manner, and as illustrated in FIG. 3, in each of timeslots TS0 and TS2 data from the STC data buffer 152 is scheduled for transmission over the serial communication interface 130. Conversely, in timeslots TS1 and TS3, when the SPI Update signal 260 indicates that new SPI data is available, such as illustrated at 410, data from the SPI frame data buffer 154 is scheduled for transmission over the serial communication interface 130. However, when no new SPI data is available, no data is scheduled for transmission over the serial communication interface 130 in timeslots TS1 and TS3, as illustrated at 420 and 430 (i.e. in the example illustrated in FIG. 2, the delay/passive data source 250 providing null data is operably coupled to the serial communication interface 130 for those timeslots).

Thus, the scheduling module 140 in the illustrated example provides a hardware solution for the configurable and flexible high speed scheduling of the SPI frames and serialized timer channels being transmitted over a shared communications channel. Significantly, such a configurable and flexible hardware solution enables different requirements from different customers to be supported through a single hard state machine comprising the scheduling module 140 herein described, thereby reducing the die size and development time as compared to conventional solutions comprising multiple hard state machines.

Figure 5:
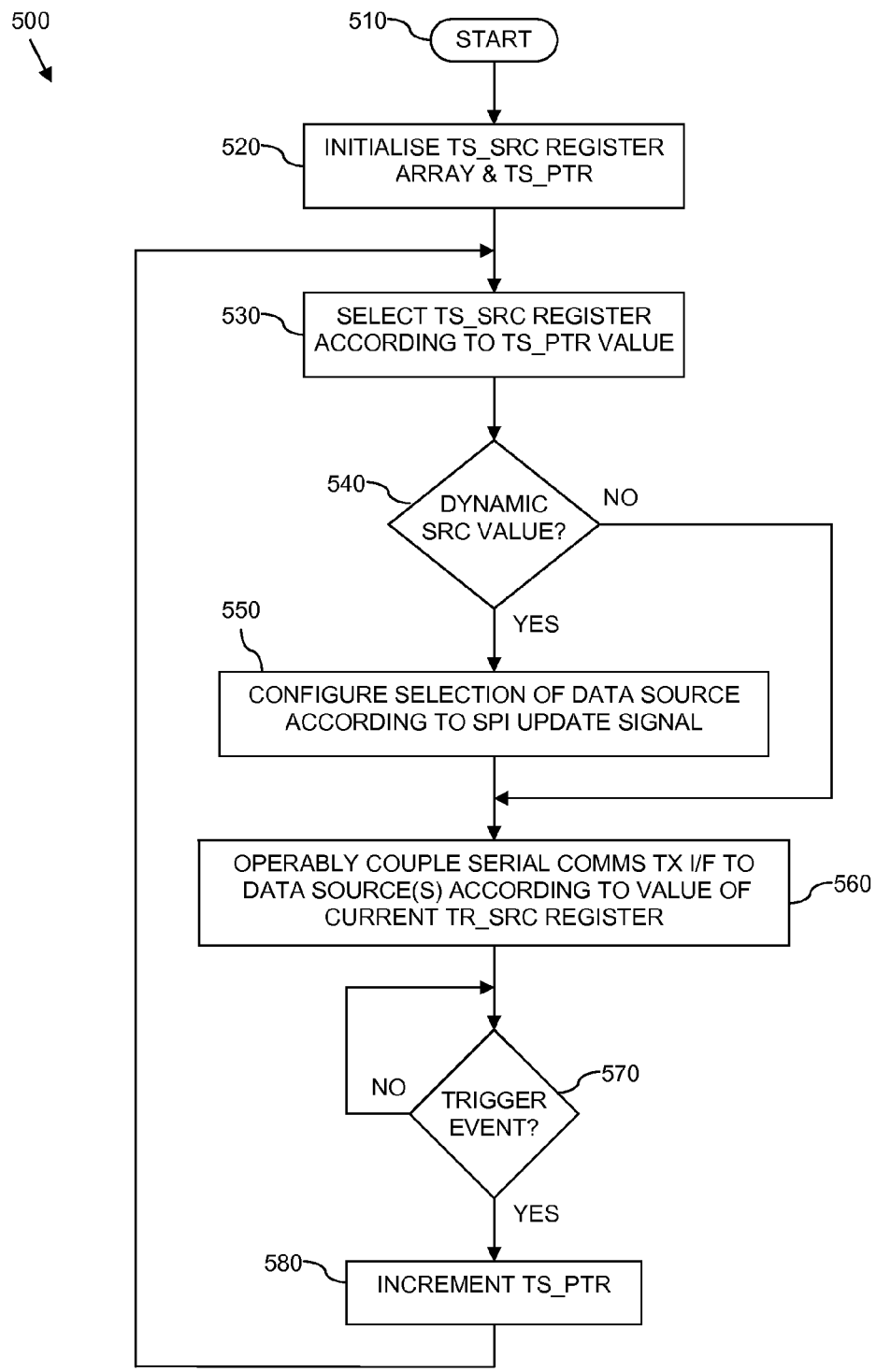
FIG. 5 illustrates a simplified flowchart of an example of a method of scheduling the transmission of data from a plurality of data sources over a serial communication interface.

Referring now to FIG. 5, there is illustrated a simplified flowchart 500 of an example of a method of scheduling the transmission of data from a plurality of data sources over a serial communication interface, such as may be implemented by way of a hard state machine such as the scheduling module 140 of FIG. 2. The method starts at 510, and moves on to 520 where an array of data source identifier registers, such as the array 210 of registers 215 of FIG. 2, and a register point value (TS_PTR), such as the register pointer value 225 of FIG. 2, are initialised. For example, such initialisation may comprising loading data source identifier values into the registers 215 in accordance with scheduling rules to be implemented, as well as resetting the register pointer value 225 to, say, '0' and configuring its range according to a required number of timeslots over which data is to be scheduled.

Next, at 530, a register within the initialised array of registers is selected according to the register point value. The method then moves on to 540 where, if the selected register comprises a dynamic source identifier value, a data source is configured to be coupled to the serial communication interface according to one or more conditional signals at 550, for example in response to a command data update signal, such as the SPI update signal 260 of FIG. 2. Next, at 560, the serial communication interface, for example in the form of the serial communication interface component 130 of FIG. 2, is then selectively coupled to a particular data source according to the source identifier value stored within the selected register (and one or more conditional signals where the selected register comprises a dynamic source identifier value), for example as described above in relation to FIG. 2.

The method then waits, at 570, for a trigger signal, upon receipt of which the method moves on to 580, where the register point value is incremented. The method then loops back to 530, where the next sequential register is selected.

In the foregoing specification, the invention has been described with reference to specific examples of embodiments of the invention. It will, however, be evident that various modifications and changes may be made therein without departing from the broader spirit and scope of the invention as set forth in the appended claims.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Although specific conductivity types or polarity of potentials have been described in the examples, it will be appreciated that conductivity types and polarities of potentials may be reversed.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

Furthermore, the terms 'assert' or 'set' and 'negate' (or 'de-assert' or 'clear') are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality. For example, the scheduling module 140 in the illustrated example has been illustrated and described as comprising a functional component distinct from the serial communications interface component 130. However, it will be appreciated that the scheduling module 140 may equally be implemented as an integral part of such a serial communications interface component 130.

Any arrangement of components to achieve the same functionality is effectively 'associated' such that the desired functionality is achieved. Hence, any two components herein combined to achieve a particular functionality can be seen as 'associated with' each other such that the desired functionality is achieved, irrespective of architectures or intermediary components. Likewise, any two components so associated can also be viewed as being 'operably connected,' or 'operably coupled,' to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms 'a' or 'an,' as used herein, are defined as one or more than one. Also, the use of introductory phrases such as 'at least one' and 'one or more' in the claims should not be construed to imply that the introduction of another claim element by the indefinite articles 'a' or 'an' limits any particular claim containing such introduced claim element to inventions containing only one such element, even when the same claim includes the introductory phrases 'one or more' or 'at least one' and indefinite articles such as 'a' or 'an.' The same holds true for the use of definite articles. Unless stated otherwise, terms such as 'first' and 'second' are used to arbitrarily distinguish between the elements such terms describe. Thus, these terms are not necessarily intended to indicate temporal or other prioritization of such elements. Furthermore, the mere fact that certain measures are recited in mutually different claims does not indicate that a combination of these measures cannot be used to advantage.

The invention claimed is:

1. A scheduling module for scheduling transmission of data from a plurality of data sources over a serial communication interface, the scheduling module comprising:
   a register array, wherein the scheduling module is arranged to
      selectively couple one of the data sources to the serial communication interface based at least partly on a source identifier value stored within a currently selected register within the register array, and
      select a next sequential register within the register array upon receipt of a trigger signal.

2. The scheduling module of claim 1, wherein the scheduling module comprises:

a register pointer component arranged to store and output a register pointer value corresponding to a register within the register array, wherein the scheduling module is arranged to selectively couple one of the data sources to the serial communication interface based at least partly on a source identifier value stored within a register within the register array to which the register pointer value corresponds.

3. The scheduling module of claim 2, wherein the register pointer component is arranged to increment the register pointer value upon receipt of the trigger signal.

4. The scheduling module of claim 1, wherein the scheduling module is arranged to schedule the transmission of data from a plurality of data sources comprising at least one from a group of:
   timing data source;
   command data source; and
   delay and/or passive data source.

5. The scheduling module of claim 1, wherein the scheduling module is further arranged to selectively couple one of the data sources to the serial communication interface further based on at least one conditional signal, upon the source identifier value stored within the currently selected register comprising a dynamic source identifier value.

6. The scheduling module of claim 5, wherein the at least one conditional signal comprises a command data update signal.

7. The scheduling module of claim 6, where the scheduling module is arranged to selectively couple a command data source to the serial communication interface upon the source identifier value within the currently selected register comprising a dynamic source identifier value, and upon the command data update signal indicating the availability of updated command data.

8. The scheduling module of claim 7, wherein the scheduling module is arranged to selectively couple one of:
   a timing data source; and
   delay/passive data source,
to the serial communication interface upon the source identifier value within the currently selected register comprising a dynamic source identifier value, and upon the command data update signal indicating no updated command data available.

9. The scheduling module of claim 1, wherein the trigger signal comprises at least one from a group comprising at least one of:
   a timer signal;
   an internal event trigger signal generated within a system-on-chip of which the scheduling module forms an integral part; and
   an external event trigger signal.

10. The scheduling module of claim 1 implemented within an integrated circuit device comprising at least one die within a single integrated circuit package.

11. A serial communication system comprising the scheduling module of claim 1.

12. A method of scheduling the transmission of data from a plurality of data sources over a serial communication interface, the method comprising:
   selectively coupling one of the data sources to the serial communication interface based at least partly on a source identifier value stored within a currently selected register within a register array; and
   selecting a next sequential register within the register array upon receipt of a trigger signal.

13. The method of claim 12, wherein the plurality of data sources comprises at least one from a group of:
   timing data source;
   command data source; and
   delay/passive data source.

14. The method of claim 12, wherein the method further comprises selectively coupling one of the data sources to the serial communication interface further based on at least one conditional signal, upon the source identifier value stored within the currently selected register comprising a dynamic source identifier value.

15. The method of claim 14, wherein the at least one conditional signal comprises a command data update signal.

16. The method of claim 15, where the method further comprises selectively coupling a command data source to the serial communication interface upon the source identifier value within the currently selected register comprising a dynamic source identifier value, and upon the command data update signal indicating the availability of updated command data.

17. The method of claim 16, wherein the method further comprises:
   selectively coupling one of a timing data source, and delay and/or passive data source to the serial communication interface upon the source identifier value within the currently selected register comprising a dynamic source identifier value; and
   indicating no updated command data available, upon the command data update signal.

18. The method of claim 12, wherein the trigger signal comprises at least one from a group of:
   a timer signal;
   an internal event trigger signal generated within a system-on-chip of which the scheduling module forms an integral part; and
   an external event trigger signal.

* * * * *